United States Patent
Oelsch (10) Patent No.: US 6,628,477 B1
(45) Date of Patent: Sep. 30, 2003

(54) SPINDLE MOTOR WITH TEMPERATURE COMPENSATION

(75) Inventor: Jürgen Oelsch, Hohenroth (DE)

(73) Assignee: Precision Motors Deutsche Minebea GmbH, Spaichingen (DE)

( * ) Notice: Subject to any disclaimer, the term of this patent is extended or adjusted under 35 U.S.C. 154(b) by 0 days.

(21) Appl. No.: 09/551,077

(22) Filed: Apr. 18, 2000

(30) Foreign Application Priority Data

| Apr. 23, 1999 | (DE) | 199 18 467 |
| Apr. 23, 1999 | (DE) | 199 18 466 |
| Apr. 23, 1999 | (DE) | 199 18 463 |

(51) Int. Cl.[7] .............................. G11B 19/20; H02K 5/16
(52) U.S. Cl. ................................................ 360/99.08
(58) Field of Search ...................... 360/99.08, 97.01; 384/492, 565, 625

(56) References Cited

U.S. PATENT DOCUMENTS

| 4,717,977 | A | * | 1/1988 | Brown | 360/98.07 |
| 4,814,652 | A | * | 3/1989 | Wright | 360/98.07 |
| 5,295,028 | A | * | 3/1994 | Elsing | 360/97.01 |
| 5,373,407 | A | * | 12/1994 | Stupak, Jr. | 360/99.08 |
| 5,485,331 | A | * | 1/1996 | Dunfield et al. | 360/99.08 |
| 5,562,349 | A | * | 10/1996 | Nespodzany et al. | 384/493 |
| 5,594,606 | A | * | 1/1997 | Hans et al. | 360/99.08 |
| 5,729,404 | A | * | 3/1998 | Dunfield et al. | 360/99.08 |
| 5,844,748 | A | * | 12/1998 | Dunfield et al. | 360/99.08 |
| 5,860,749 | A | * | 1/1999 | Hirakawa et al. | 384/492 |
| 5,896,242 | A | * | 4/1999 | Albrecht et al. | 360/99.08 |
| 6,135,641 | A | * | 10/2000 | Smith | 384/493 |
| 6,185,067 | B1 | * | 2/2001 | Chamberlain | 360/99.08 |
| 6,330,126 | B1 | * | 12/2001 | Ishizaki et al. | 360/99.08 |

FOREIGN PATENT DOCUMENTS

| JP | 2000-078811 | * | 3/2000 | H02K/21/22 |
| JP | 2000-078813 | * | 3/2000 | H02K/21/22 |
| JP | 2000-078814 | * | 3/2000 | H02K/21/22 |
| JP | 2000-078815 | * | 3/2000 | H02K/21/22 |

* cited by examiner

Primary Examiner—George J. Letscher
Assistant Examiner—Christopher R Beacham
(74) Attorney, Agent, or Firm—Lackenbach Siegel LLP (57) ABSTRACT

The invention relates to a spindle motor, in particular for driving a hard disk drive, with a stator, a rotor and a shaft disposed between stator and rotor, which supports at least one roller bearing, which comprises an inner and an outer bearing ring with roller bodies disposed between them. According to the invention the spindle motor comprises a device for the temperature compensation. In a first embodiment the invention is distinguished thereby that at least one equilibration element is provided which acts onto the outer and/or inner bearing ring, [which element is] disposed between the corresponding bearing ring and a part supporting the bearing ring, and has a specified coefficient of thermal expansion $\alpha$. In a second embodiment the shaft is used as equilibration element, wherein the shaft comprises a material with a low coefficient of thermal expansion $\alpha$. As a further embodiment it is proposed to use for the bearing configuration roller bodies which comprise a material with a high coefficient of thermal expansion and thus act themselves as equilibration elements.

16 Claims, 9 Drawing Sheets

SPINDLE MOTOR WITH TEMPERATURE COMPENSATION

The invention relates to a spindle motor, in particular for driving the storage disk(s) of a hard disk drive, with a stator, a rotor, and a shaft disposed between stator and rotor, which bears at least one roller bearing, which comprises an inner and an outer bearing ring with roller bodies disposed between them.

For reasons of the accuracy of running such a spindle motor, conventionally prestressed roller bearing pairs are used, with the aid of which the rotor is supported rotatably relative to a stator disposed in a base plate. Therein the prestress impressed upon the bearing system causes elastic deformations at each of the contact sites of the roller bodies with the bearing rings. The degree of deformation is a function, for one, of the bearing geometry, thus of the radii of the inner and outer raceway, of the diameter of the roller bodies and of the radial play, for another, of the amplitude of the "frozen-in" prestress force. In order for the read/write function of a hard disk drive to be ensured, (the read/write head mounted on a pivotable arm moves at a flying height of only 0.001 to 0.002 mm relative to the disk surface), apart from the running accuracy of the motor, the surface of the rotating storage disk must extend at every site and at every point in time as much as possible at right angles with respect to the axis of rotation. This means that the axial or front wobble of the disk must be very low. In order to attain minimum values in this regard, a pressfit is conventionally used for the seat of the roller bearing rings in the corresponding bore of the rotor. The interference fit, accordingly constructively specified, of the bearing ring(s) in the fit joint permits to develop in the joined parts tangential and radial stresses which are greater the greater the interference fit of the joined parts.

These stresses bring about, on the one hand, a widening of the bore in the rotor and, on the other hand, a constriction of the roller bearing outer ring(s) and thus a decrease of the "nominal" radial play in the roller bearing(s) accordingly in consequence of the growth of the degree of the elastic deformations.

But since the elastic deformations are a measure of the rigidity of the entire system, the oscillatory behavior of this system also changes with the degree of elastic deformations. At the same inertia, thus, at a high degree of elastic deformation, the intrinsic frequency of the resonant "spring-mass system" is high and accordingly low at a low increment of elastic deformation. A further component determining the intrinsic frequency of the rotating system are the storage disks fastened on the rotor which—viewed by themselves— also represent a resonant system with system-specific intrinsic frequency.

Thus, overall a total resonant system is to be considered which comprises essentially two spring-mass systems coupled to one another, whose system-specific parameters determine the intrinsic resonance frequency(-ies) of the total system impairing function.

Important for the function of the hard disk drive is that the system-immanent dynamic disturbances, caused in particular by form deviations of the roller bearing components, do not coincide with the intrinsic frequencies of the total system. This requirement must be ensured under all operating conditions since, otherwise, the oscillation amplitudes generated at resonance can readily lead to read/write errors. Due to the, to some extent, rather small critical safety spacing, further narrowed between intrinsic and interference frequencies, the intrinsic frequencies of the total system should remain as much as possible constant in the relevant temperature range of approximately +5° C. to +55° C. If this is not ensured, especially with the enormously increasing storage densities of current hard disk drives, fabrication inaccuracies of the roller bearing can lead to an undesirable excitation of the intrinsic frequency(-cies) and thus to non-acceptable function disturbances in the form of extremely long access times up to the processing of defective or wrong data.

Within the current state of the art aluminum is customarily used for the rotor and roller bearing steel [is used] for the bearing. The coefficient of thermal expansion of these two materials, however, differs by the factor 2 since $\alpha$-aluminum is approximately $24*10^{-6}[K^{-1}]$ and $\alpha$-steel approximately $12*10^{-6}[K^{-1}]$. This means that with increasing temperature the aluminum of the rotor enclosing the roller bearing outer rings expands more strongly than the bearing rings themselves. Thereby, with increasing temperature, the interference fit decreases in the fit joint whereby the "nominal" radial play in the bearing increases. But greater radial play means a decrease of the elastic deformation whereby the rigidity of the total system decreases. Since the modulus of elasticity of the storage disk also decreases with increasing temperature, an undesirable temperature dependence of the intrinsic frequency of the total system results. Thus, the intrinsic frequency, contrary to the initially posed requirement, decreases with increasing operating temperature or, conversely, increases with decreasing temperature which, especially in the case of fixed disks with high storage density, can lead to function disturbances during operation.

It is therefore the task of the invention to counteract a temperature-dependent change of the radial play of the roller bearings as a cause of the temperature dependence of the intrinsic frequency, thus to minimize or eliminate it completely.

This task is solved according to the invention by the characteristics of the independent patent claims.

In a first embodiment the invention is distinguished thereby that at least one equilibration element is present acting upon an outer and/or inner bearing ring, which is disposed between the corresponding bearing ring and a part bearing the bearing ring, and which has a specified coefficient of thermal expansion $\alpha$. The equilibration element is preferably structured annularly, like the bearing rings themselves.

The equilibration element is preferably disposed directly on the stator, on the shaft or on the rotor, with the equilibration element being capable of bracing itself on suitable surfaces of these structural components.

A development of the invention provides that the outer bearing ring is for the most part encompassed by the equilibration element. The equilibration element preferably comprises a material with low coefficient of thermal expansion, such as, for example ceramic material. Since the equilibration element expands only slightly at an increase of the temperature, the outer ring is forced to become shifted inwardly in the direction of the inner ring in the sense of a constriction. The decrease of the nominal radial play caused thereby counteracts a temperature-dependent decrease of the bearing prestress.

In another development of the invention an equilibration element is used which comprises a material having a high coefficient of thermal expansion $\alpha$, preferably $\alpha > 12*10^{-6} [K^{-1}]$.

The equilibration element can be disposed such that it expands in the axial direction at a temperature increase and exerts a force on the associated bearing ring in the axial direction. Likewise, the equilibration element can be disposed such that at a temperature increase it expands in the radial direction and exerts a force on the associated bearing ring in the radial direction. A combination of axial and radial action of one or several equilibration elements on one or several bearing rings is also possible.

A further development of the invention provides that the equilibration element is not disposed directly on the shaft but on an annular insert disposed on the shaft. This allows for the simpler positioning of the equilibration element, in particular if the equilibration element is to act in the axial direction onto a bearing ring.

The annular insert preferably comprises a material with a low coefficient of expansion $\alpha$, which means, at a temperature increase, a reference surface expanding only slightly for the equilibration element is formed. But, instead of a separate annular insert, a ring connected integrally with the shaft or a collar formed onto the shaft can also be provided.

According to the invention it is insignificant whether the equilibration element comprises one or several parts.

As materials with high coefficients of expansion $\alpha$ for the production of the equilibration element aluminum, aluminum alloys or synthetic material can be used. As materials with low coefficient of expansion $\alpha$ steel, steel alloys or ceramic materials are possible.

In a further embodiment of the invention the shaft itself is used as the equilibration element. In this case, the shaft comprises a material with low coefficient of expansion $\alpha$. The inner rings are disposed on the shaft and fixedly connected with it. The coefficient of thermal expansion of the shaft is preferably lower than the coefficient of thermal expansion of outer and inner ring(s).

As an alternative to the use of separate equilibration elements for the compensation of the "nominal" radial play with temperature variations, the roller bodies themselves can be used as equilibration elements. Herein the roller bodies comprises a material with a higher coefficient of thermal expansion $\alpha$, preferably $\alpha > 12*10^{-6}[K^{-1}]$, while the associated outer and/or inner bearing rings comprise a material with a lower coefficient of thermal expansion $\alpha$, preferably a $<12*10^{-6}[K^{-1}]$.

In order to be able to control the effect of the expansion of the roller bodies better, it is preferred if the coefficient of expansion of the roller bodies is substantially higher than the coefficient of expansion of the bearing rings or of the remaining bearing components.

In the following the invention will be explained in further detail in conjunction with several embodiment examples with reference to the figures of the drawing. Further characteristics, advantages and applications of the invention are evident in the drawings. Therein depict.

In the following embodiment examples mainly annular equilibration elements are depicted, which are referred to as equilibration rings in the following. However, it is within the scope of the invention to use other types of equilibration elements.

Figure 1:
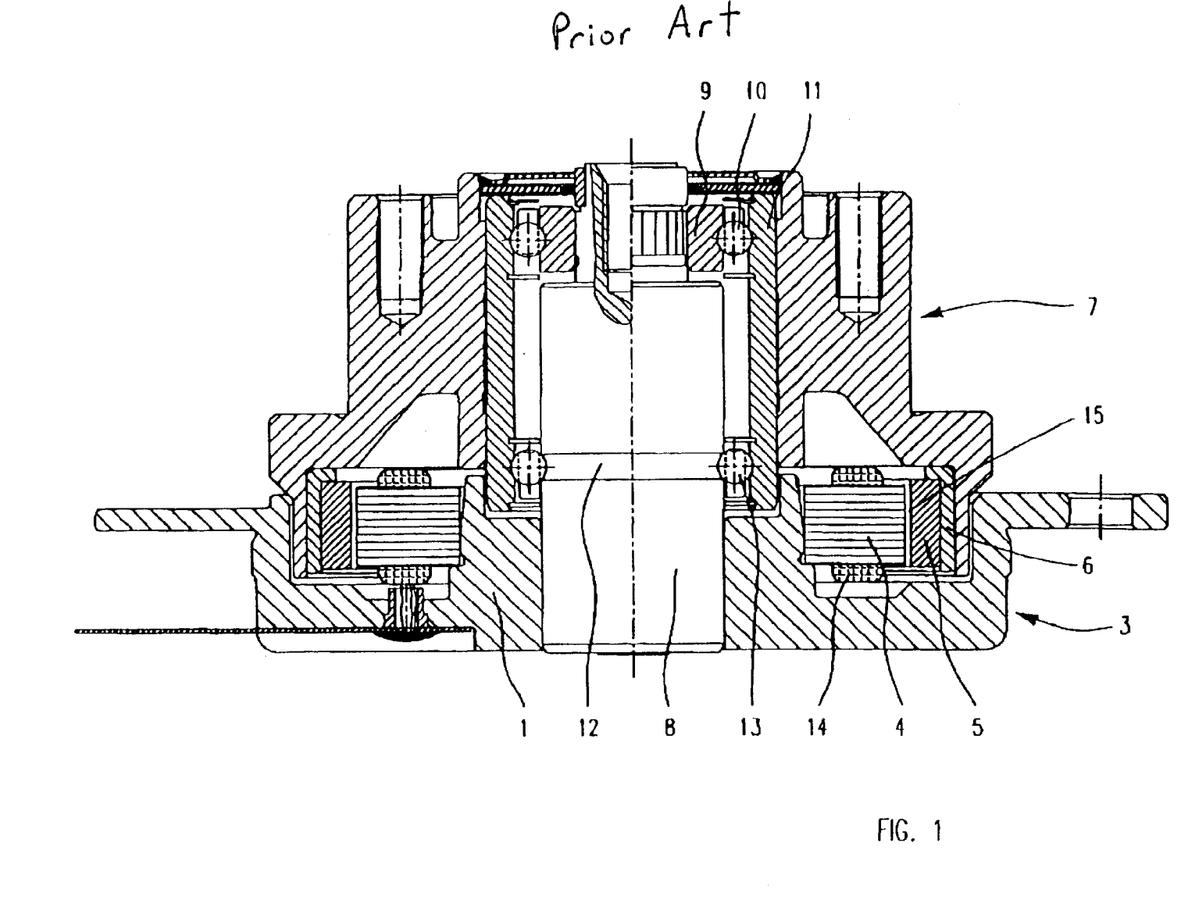
FIG. 1: a section of a spindle motor according to prior art.

FIG. 1 depicts a section through a spindle motor according to prior art. The spindle motor comprises a stator 3 and a rotor 7 rotatably supported relative to the stator 3. The stator 3 is formed by a base plate 1 in whose annular recess a stack of laminations 4 is disposed which supports a winding 14. The rotor 7 supports at its inner periphery an iron magnetic flux return 6 on which an annular permanent magnet 5 is disposed at the inside, whose magnet pol pairs are preferably implemented radially. The permanent magnet 5 of the rotor 7 is spaced apart relative to the winding set 4 of stator 3 via a concentric air gap 15.

A shaft 8 is fixedly connected with the base plate 1. The rotor 7 is rotatably supported on the shaft 8. Between the shaft 8 and the rotor 7 are disposed bearing configurations, preferably roller bearings. The upper bearing configuration comprises an inner ring 9 and an outer ring 11. The inner ring 9 is connected stationarily with the shaft 8, while the outer ring 11 is fixedly connected with the rotor 7. Between the inner ring 9 and the associated outer ring 11 roller bodies 10 are disposed, which preferably comprise balls. However, the roller bodies can also be developed in the form of a barrel, cylinder or in other known manner.

The lower bearing configuration is formed thereby that between a raceway 12 of shaft 8 and the continuous outer ring 11 further roller bodies 13 are disposed. In this bearing configuration the inner ring is thus formed by the shaft 8 itself. However, a separate inner ring can also be provided.

The continuous outer ring 11 does not need to be developed integrally but rather can comprise two parts, one for the upper bearing configuration and one for the lower bearing configuration. However, at least one part, positionably during the assembly is always required, for example the inner ring 9 in order to generate in the bearing a prestress relative to the outer ring 11.

In the depicted embodiment example the inner ring 9 is connected with the shaft 8, for example, through an adhesion connection wherein during the adhesion process an axially directed force is exerted onto the inner ring 9 which presses the inner ring axially downwardly such that the roller bodies 10 transmit the force onto the outer ring 11 and, as a consequence of the generated elastic deformations, the desired mechanical prestress between inner ring(s) and outer ring(s) is attained. If the ambient temperature increases, the components of the spindle motor are heated and, correspondingly also the bearing components. The discrete bearing components as well as the rotor embracing the outer bearing ring(s), expand; in particular the constriction of the outer ring(s), caused by the press seat between rotor 7 and outer ring 11, 24 decreases, whereby the nominal bearing play increases undesirably.

Figure 2:
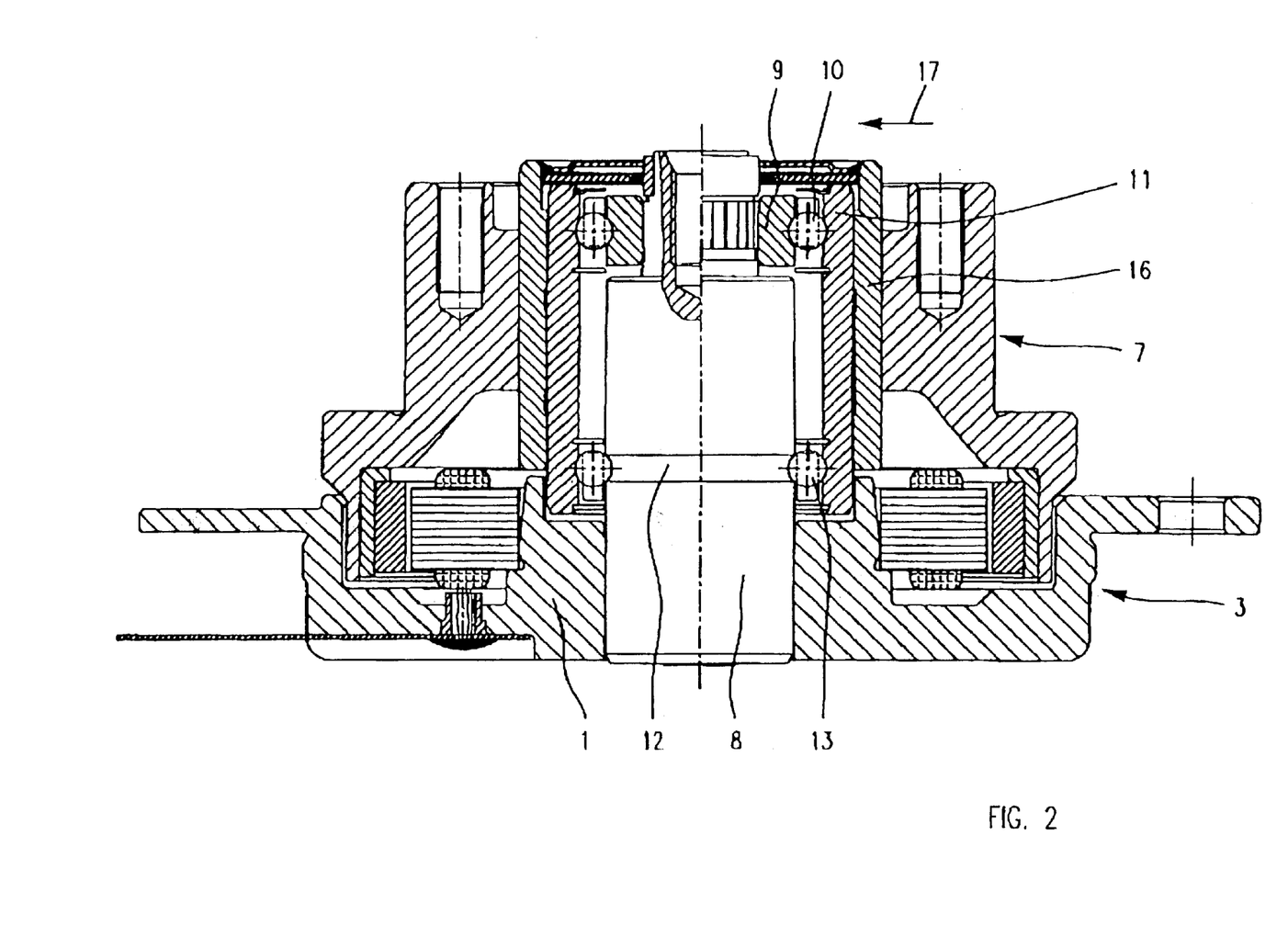
FIG. 2: a spindle motor with bearing configuration and equilibration element for the radial action onto the outer bearing ring.

In order to counteract this effect, FIG. 2 shows a spindle motor which substantially corresponds to the motor according to FIG. 1. According to the invention an equilibration ring 16 is provided which is disposed between rotor 7 and the outer bearing ring 11 and which essentially completely encompasses the bearing ring 11. The equilibration ring 16 is comprised of a material with a high coefficient of thermal expansion, for example a high-temperature stable synthetic material and expands relatively strongly at increasing temperature. If the ambient temperature increases, the bearing rings 9, 11 expand. The rotor 7 comprising aluminum, however, expands more strongly than the bearing parts comprising steel such that the constriction of the outer ring(s) would decrease and the nominal bearing play would increase. But thereby that the coefficient of thermal expansion of the equilibration ring 16 is higher than that of rotor 7, instead, the equilibration ring 16 expands to a far greater degree than the bearing rings 9, 11 and specifically in the direction of arrow 17 opposite to the direction of expansion of the outer bearing ring 11. The equilibration ring 16 thus exerts a force, directed radially inwardly, onto the outer bearing ring 11 which is thereby pressed or constructed radially inwardly, whereby the temperature-dependent enlargement of the bearing play is compensated. The original construction of the outer bearing ring 11 thus is retained and therewith the setup prestress of the bearing also remains largely constant in spite of the temperature change. To the same degree the equilibration ring 16 acts onto the lower bearing configuration which is formed by the shaft 8, the roller bodies 13 and the outer ring 11. It is equally possible to use an equilibration ring 16 which is comprised of a material with low coefficient of thermal expansion, such as, for example, ceramic material. Since the equilibration ring 16 expands only slightly with an increase of temperature, the outer ring 11 is forced to "expand" inwardly in the direction of the inner ring 9, whereby the nominal bearing play is decreased and the prestress is even increased with increasing temperature. This is especially desirable when the roller bodies also comprise ceramic, thus, cannot expand to the same extent as the encompassing steel parts.

Figure 3:
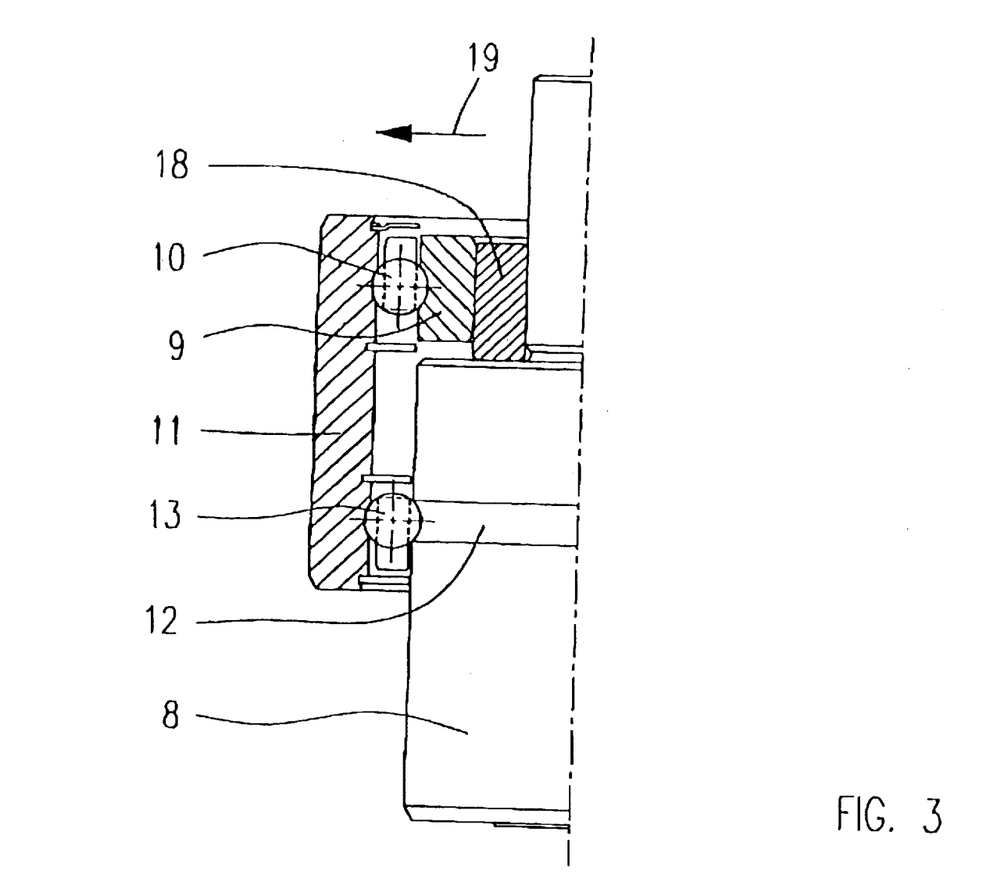
FIG. 3: a bearing configuration with equilibration element for the radial action onto the inner bearing ring.

FIG. 3 depicts an enlarged section of a bearing configuration for the spindle motor of a hard disk drive with an equilibration ring 18 disposed on the shaft which acts onto the inner ring 9 disposed radially further out. Through the equilibration ring 18 at a temperature increase the inner ring 9 is pressed outwardly in the radial direction (direction of arrow 19), thus expanded, whereby, in turn, the nominal radial play is reduced.

Figure 4:
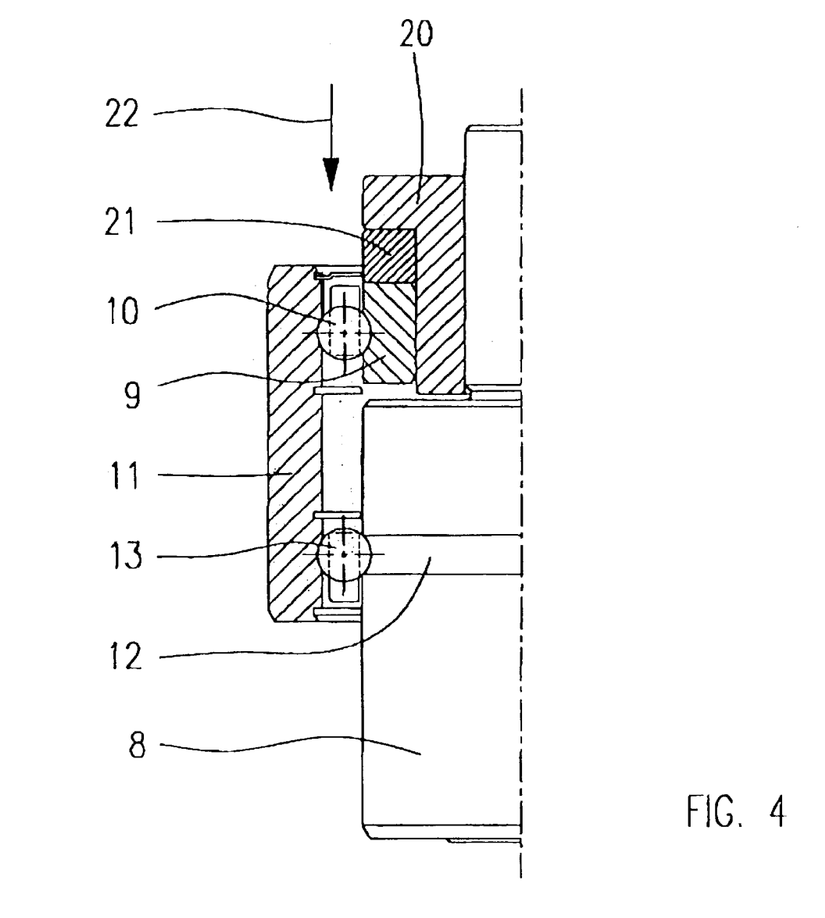
FIG. 4: a bearing configuration with equilibration element for the axial action onto the inner bearing ring.

FIG. 4 depicts a bearing configuration similar to FIG. 3, wherein an equilibration ring 21 is present which acts in the axial direction 22 onto the inner ring 9. The equilibration ring 21 is not seated directly on shaft 8 but rather is supported by an annular insert 20, which annular insert is fastened on the shaft. The annular insert 20 comprises at the upper end a flange on which the equilibration ring 21 is in contact and stayed in the axial direction. If the ambient temperature increases, the bearing components 9, 11 expand in known manner. The equilibration ring also expands, however, more strongly than the encompassing parts and thereby exerts an axial force directed in the direction of arrow 22 onto the inner ring 9. This force causes a displacement of the inner ring 9 relative to the outer ring 11 in the axial direction whereby the nominal play and the prestress of the bearing increases. This embodiment is used preferably in particular when using roller bodies of ceramic since in this case the original prestress can be kept constant.

Figure 5:
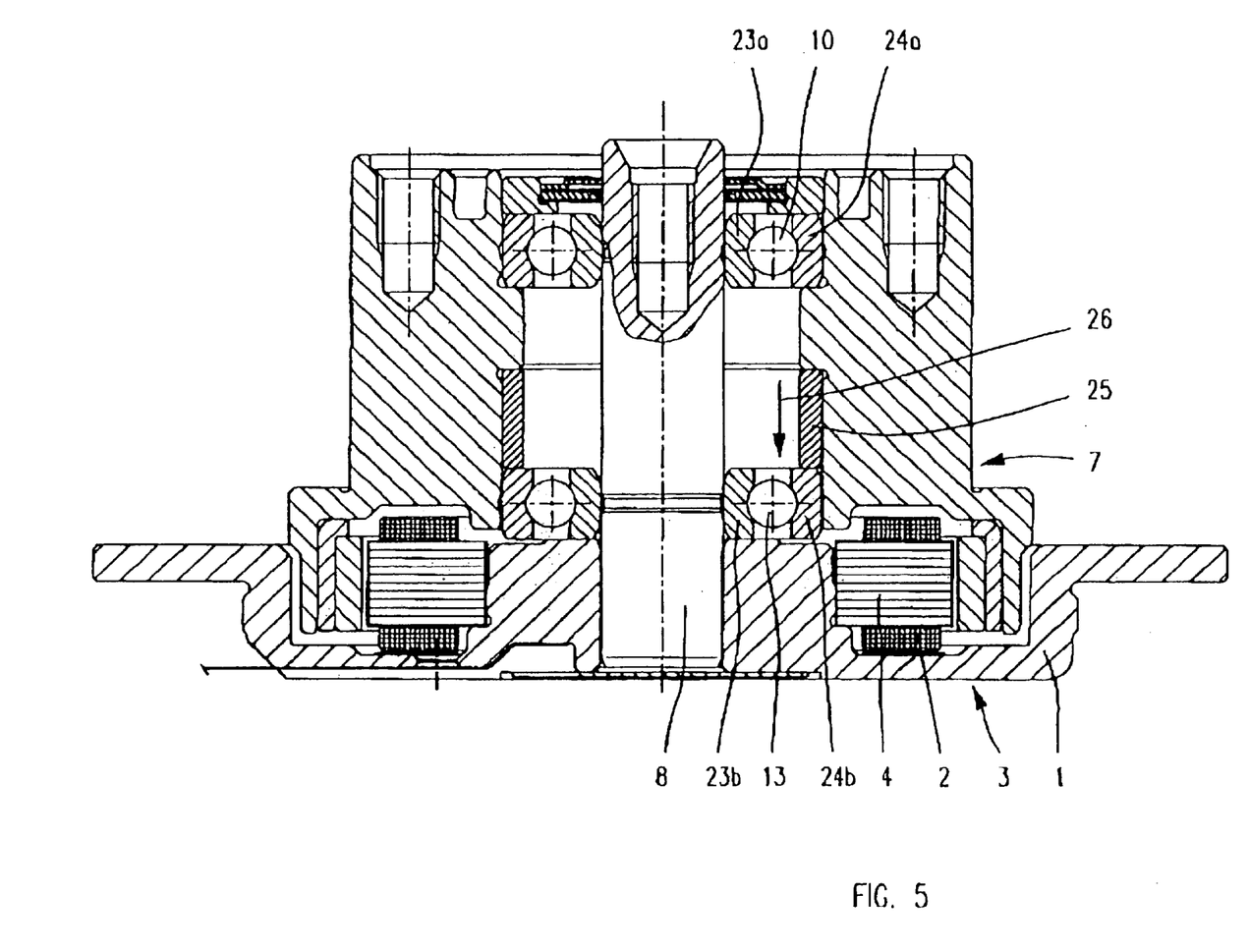
FIG. 5: a spindle motor with bearing configuration and equilibration element for the axial action onto the outer bearing ring.

FIG. 5 depicts an embodiment of a spindle motor with two bearing configurations each comprising an inner ring 23a or 23b, an outer ring 24a or 24b and roller bodies 10 or 13 disposed between them. Between the two bearing configurations is disposed an equilibration ring 25 which is embedded in an annular groove of the inner surface of the rotor 7. If the temperature of the spindle motor increases, all components expand according to their material-specific coefficients of thermal expansion. The rotor 7 comprised of aluminum expands more strongly than the outer rings 24a, 24b comprised of steel, whereby the constriction caused by the press seat between rotor 7 and outer rings 24a, 24b of the outer rings decreases and the nominal bearing play increases. Thereby that the equilibration ring 25 expands more strongly than rotor 7, it exerts a force in the direction of arrow 26 onto the lower outer ring 24b. This force causes a displacement of the outer ring 24b in the direction of arrow 26 whereby the original nominal bearing play is restored again.

Figure 6:
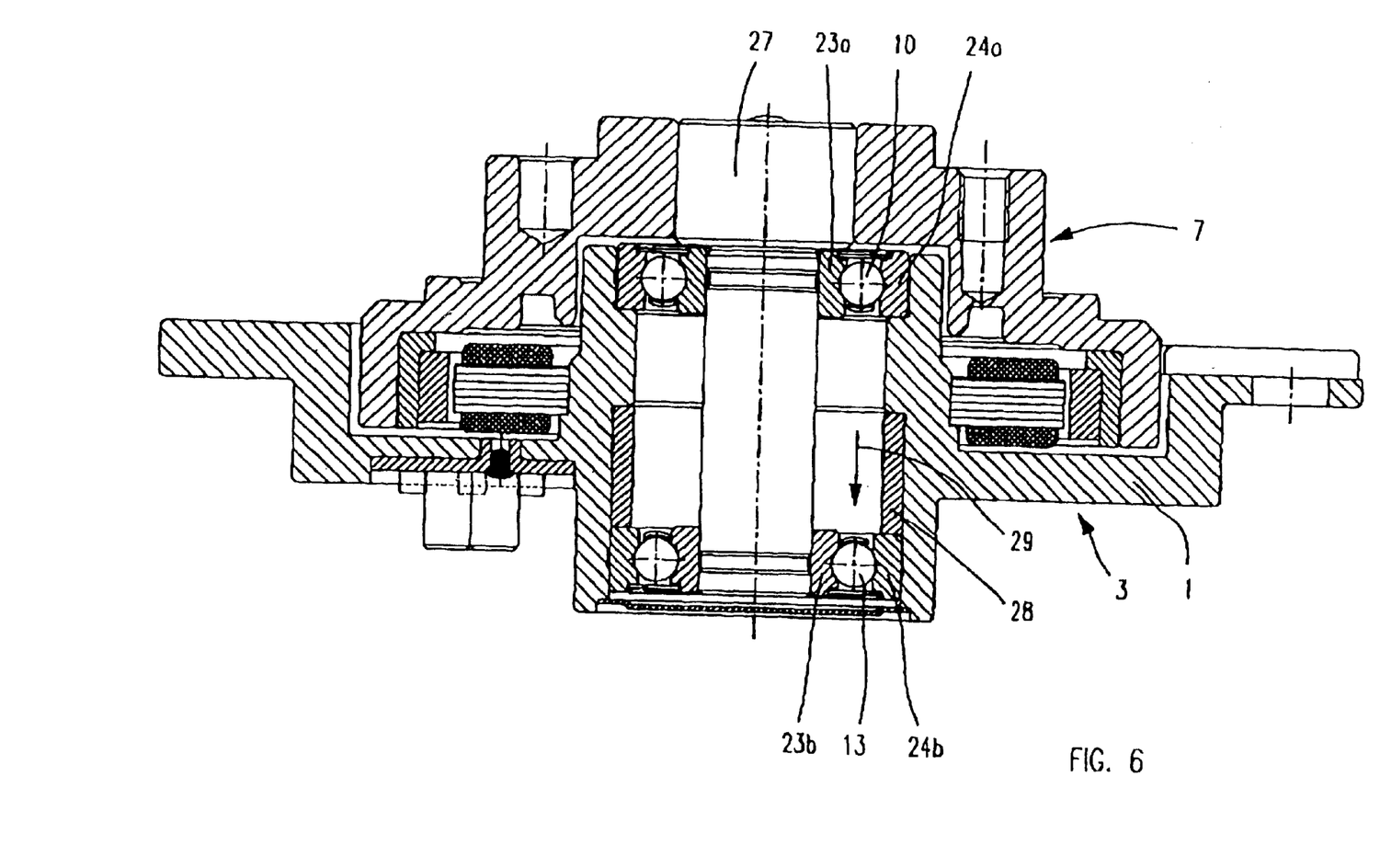
FIG. 6: a spindle motor with bearing configuration and equilibration element similar to FIG. 5, however with rotating shaft.

FIG. 6 depicts an embodiment of a spindle motor with a rotating shaft 27 fixedly connected with rotor 7 and two separate bearing configurations such as the embodiment according to FIG. 5 also comprises. Each of the bearing configurations comprises an inner ring 23a or 23b, an outer ring 24a or 24b, and roller bodies 10 or 13 disposed between them. Between the two bearing configurations is disposed an equilibration ring 28, which is embedded in an annular groove of the inner surface of the stator 3, stated more precisely, of the base plate 1. If the temperature of the spindle motor increases, the bearing components, as well as also the equilibration ring 28, expand. The equilibration ring 28 is in contact on the front side of the outer ring 24b of the lower bearing configuration. When the equilibration ring 28 expands, an axial force, directed in the direction of arrow 29, is exerted onto the front side of the lower outer ring 24b. Thereby the lower outer ring 24b becomes displaced relative to the lower inner ring 23b in the axial direction whereby the increase of the nominal bearing play, due to decreasing constriction of the outer ring, is again canceled or compensated and the original prestress of the bearing is again restored.

Figure 7:
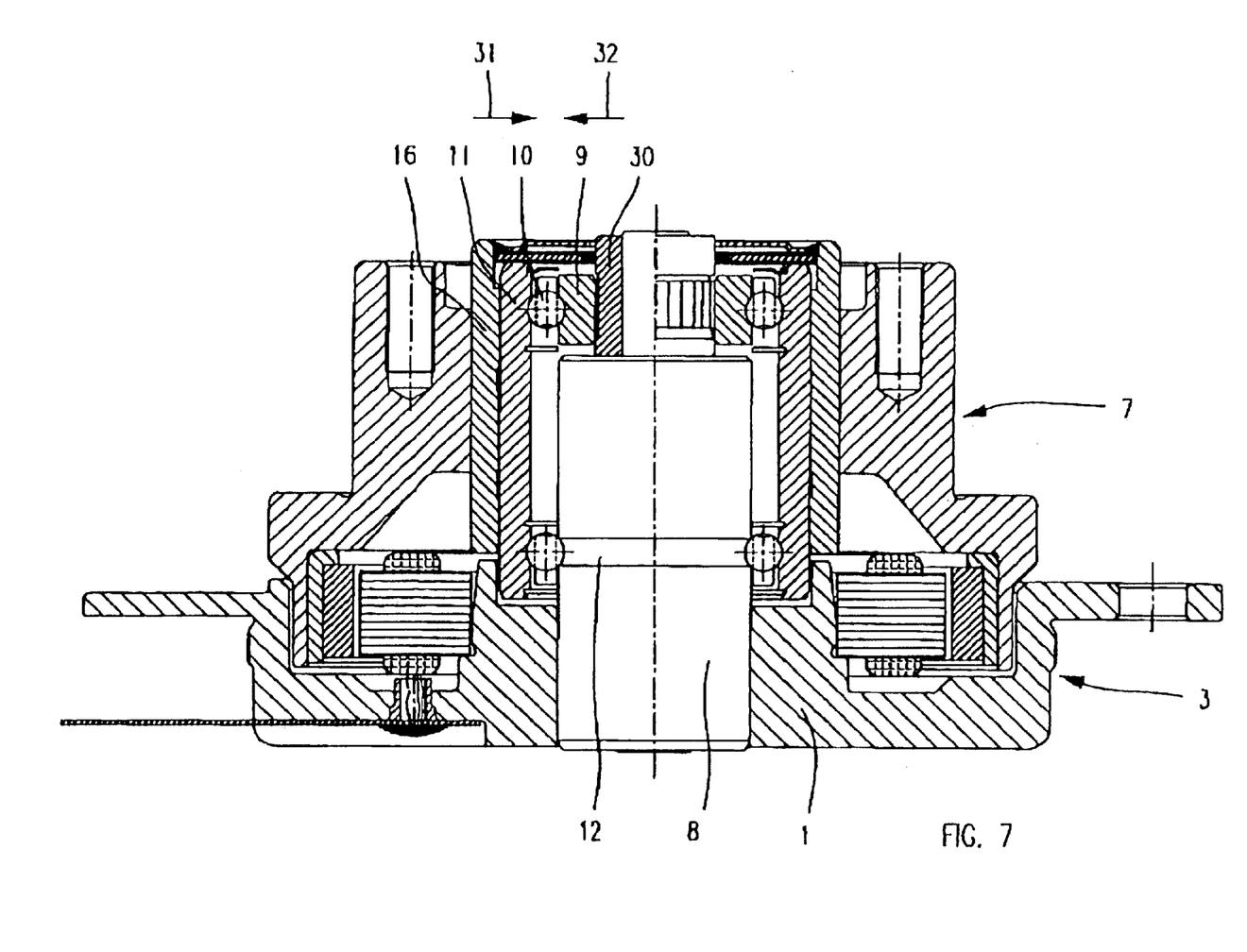
FIG. 7: a spindle motor with bearing configuration and equilibration element for the cooperative or simultaneous radial action onto the outer and inner bearing ring.

In FIG. 7 is shown a spindle motor which corresponds essentially to the embodiment according to FIG. 2. The outer ring 11 is encompassed by an equilibration ring 16. In addition, a further equilibration ring 30 is provided which is disposed on shaft 8 and which acts onto the inner ring 9. Through the equilibration rings 16 and 30 a simultaneous radial action onto the outer and inner bearing ring 11, 9 in the direction of arrows 31, 32 is attained, wherein with suitable selection of the materials of the equilibration rings 16, 30 a very good temperature compensation of the bearing play can be attained.

Figure 8:
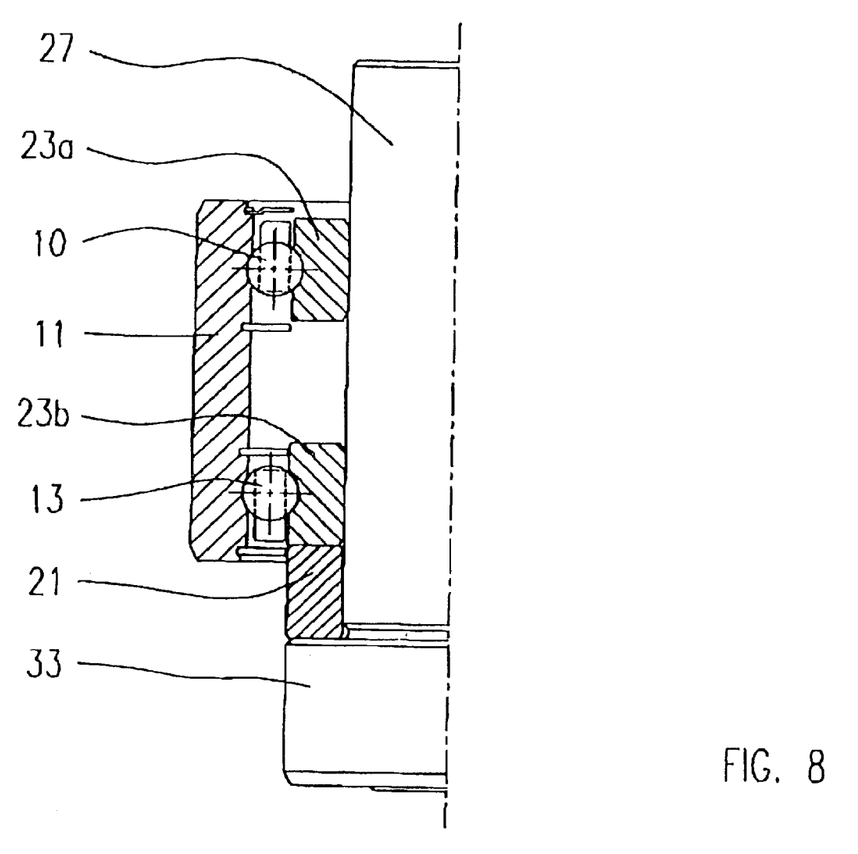
FIG. 8: a further bearing configuration in partial section for the spindle motor of a hard disk drive with equilibration element for the axial action onto an inner bearing ring.

In FIG. 8 is shown a bearing configuration with two inner rings 23a, 23b disposed on a shaft 27, a common outer ring 11 for the two roller body collective sets with roller bodies 10, 13 and an equilibration ring 21 which is mounted between a collar 33 formed on the shaft and the lower inner ring 23b.

The lower inner ring 23b is freely movable in the axial direction, the upper inner ring 23a, in contrast, is fixedly connected with the shaft 27 by measures known per se, for example by adhesion, welding, pressing or the like. This connection transmits the axial forces resulting from the frozen-in prestress onto the upper shaft end, whereas the lower inner ring 23b transmits the axial forces, directed oppositely, onto the equilibration ring 21, which, in turn, is stayed on the collar 33 formed on at the lower shaft end.

The coefficient of thermal expansion of shaft 27 and of the roller bodies 10, 13 is identical to or less than the coefficient of thermal expansion of the outer and inner ring(s). The coefficient of thermal expansion of the equilibration ring 21, in contrast, is higher than that of outer and of outer and inner rings 11, 23a, 23b.

At a temperature increase the equilibration ring 21 expands in the axial direction comparatively more strongly than the corresponding longitudinal section on shaft 27. Thereby the lower inner ring 23b is displaced in the direction to the upper inner ring 23a, fixedly connected with shaft 27, whereby, in turn, the "nominal radial play", due to decreasing constriction of the common outer ring 11, in spite of the temperature increase does not undergo any change and, consequently, the "frozen-in" prestress and therewith also the degree of elastic deformation remains constant.

Figure 9:
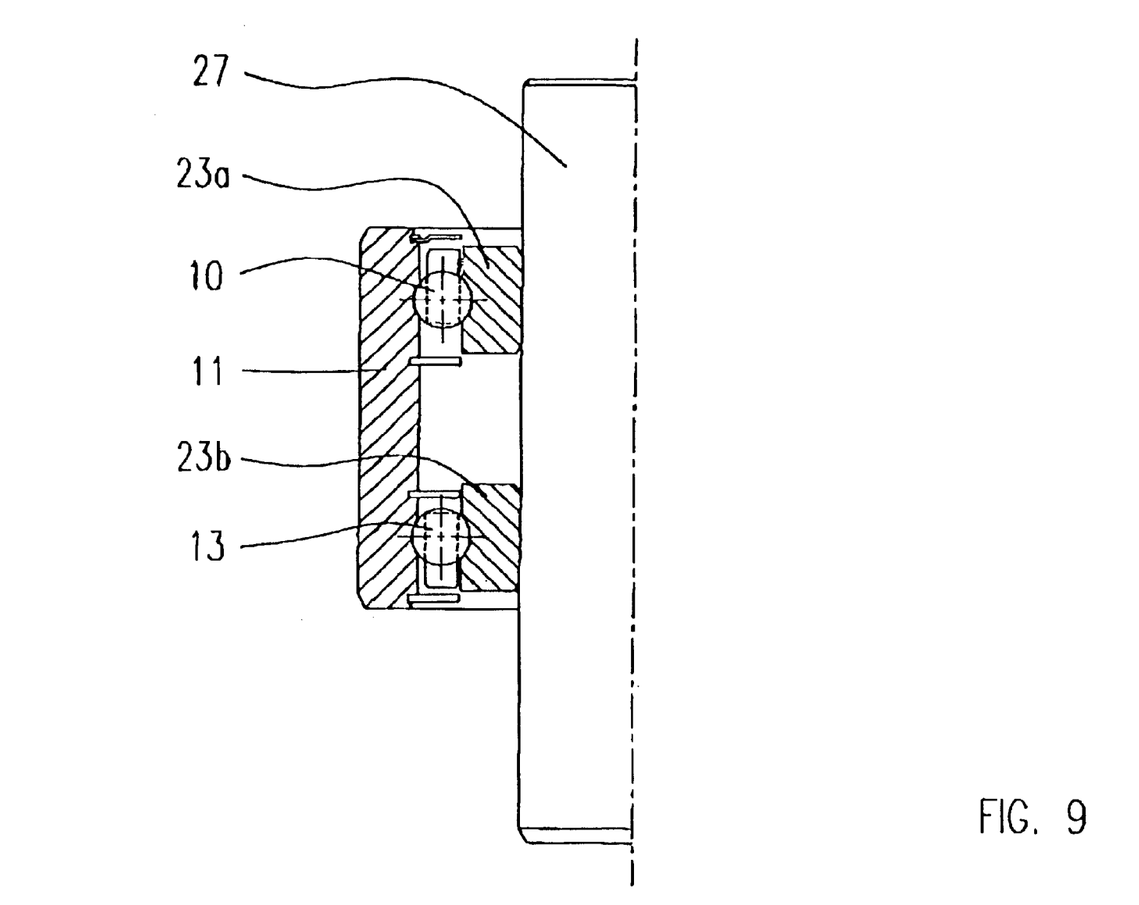
FIG. 9: in partial section a different bearing configuration for the spindle motor of a hard disk drive, in which the shaft acts directly as equilibration element in the axial direction onto the two inner rings.

In FIG. 9 is shown a bearing configuration with two inner rings 23a, 23b, disposed on the shaft 27, roller bodies 10, 13 and a common outer ring 11. An additional equilibration element is omitted since the shaft 27 itself serves as equilibration element. Both inner rings 23a, 23b are fixedly connected with the shaft 27 through measures known per se such as, for example, welding, pressing or adhesion. The axial forces generated from the "frozen-in" prestress are transmitted from the inner rings 23a, 23b via the connection site onto shaft 27, such that in the shaft 27 in the region between the inner rings 23a, 23b, tensile stresses are generated which are equivalent to the transmitted axial forces.

The coefficient of thermal expansion of shaft 27 is less than the coefficient of thermal expansion of outer and inner ring(s) 11, 23a, 23b. At a temperature increase the outer ring 11 expands in the axial direction, however, the inner rings 23a, 23b, fastened on the shaft, do not change their distance from one another due to the minimal coefficient of thermal expansion of shaft 27 to the same extent as the outer ring 11. Thereby, in turn, the "nominal" radial play due to the decreasing constriction of the outer ring 11, can be maintained in spite of the temperature increase, such that in this case the frozen-in prestress, and thus the elastic deformations, do not undergo any changes.

Alternatively to the use of equilibration rings for the compensation of the nominal bearing play with temperature changes, the roller bodies themselves can be used as equilibration elements. With the spindle motor according to FIG. 1, which has a relatively strong temperature-dependent bearing play, according to the invention roller bodies 10, 13 with a specified coefficient of expansion can be used. The coefficient of expansion of the roller bodies should be higher than the coefficient of expansion of the bearing rings. An enlargement of the nominal bearing play, which occurs with a temperature increase, is counteracted by the overproportional expansion of the roller bodies 10, 13.

DRAWING LEGEND

1 Base plate
2 Winding
3 Stator
4 Stack of laminations
5 Permanent magnet
6 Iron magnetic flux return
7 Rotor
8 Shaft
9 Inner ring
10 Roller bodies
11 Outer ring
12 (inner) raceway
13 Roller bodies
14 Winding
15 Air gap
16 Equilibration ring
17 Direction of arrow
18 Equilibration ring
19 Direction of arrow
20 Annular insert
21 Equilibration ring
22 Direction of arrow
23 Inner ring 23a, 23b
24 Outer ring 24a, 24b
25 Equilibration ring
26 Direction of arrow
27 Shaft (rotating)
28 Equilibration ring
29 Direction of arrow
30 Equilibration ring
31 Direction of arrow
32 Direction of arrow
33 Collar

What is claimed is:

1. Spindle motor, in particular for driving the storage disk(s) of a hard disk drive, with a stator, a rotor, a shaft disposed between stator and rotor, at least one roller bearing disposed on the shaft, which comprises an inner and an outer bearing ring with roller bodies disposed between them;

at least one equilibration means for decreasing nominal radial play in the roller bearing (16, 18, 21, 25, 28, 30) by acting upon at least one outer and/or inner bearing ring (9, 11, 23, 24), which is disposed between the corresponding bearing ring (9, 11, 23, 24) and a part supporting the bearing ring, and which has a specified coefficient of thermal expansion α; and characterized in that the equilibration element (21) is disposed on an annular insert (20) disposed on the shaft (8).

2. Spindle motor as claimed in claim 1, characterized in that the at least one equilibration element (16, 18, 21,25,28, 30) is implemented annularly.

3. Spindle motor as claimed in claim 1, characterized in that the at least one equilibration element (16, 18, 21, 25, 28, 30) is disposed on the stator (3), on the shaft (8) or on the rotor (7).

4. Spindle motor as claimed in claim 1, characterized in that the outer bearing ring (11) is for the most part encompassed by the equilibration element (16).

5. Spindle motor as claimed in claim 1, characterized in that the equilibration element (16, 18, 21, 25, 28, 30) comprises a material with a high coefficient of thermal expansion $\alpha < 12*10^{-6}[K^{-1}]$.

6. Spindle motor as claimed in claim 1, characterized in that the equilibration element (16) comprises a material with a lower coefficient of thermal expansion $\alpha < 12*10^{-6}[K^{-1}]$.

7. Spindle motor as claimed in claim 1, characterized in that the equilibration element (21,25,28) is disposed such that it expands in the axial direction with a temperature increase and exerts a force in the axial direction onto the associated bearing ring.

8. Spindle motor as claimed in claim 1, characterized in that the equilibration element (16, 18, 30) is disposed such, that it expands in the radial direction with a temperature increase and exerts a force in the radial direction onto the associated bearing ring.

9. Spindle motor as claimed in claim 1, characterized in that the equilibration element (16, 18, 21, 25, 28, 30) is comprised of several parts.

10. Spindle motor as claimed in claim 1, characterized in that the equilibration element comprises a material selected from the group consisting of aluminum, aluminum alloys, and synthetic material.

11. Spindle motor as claimed in claim 1, characterized in that the equilibration element comprises a material selected from the group consisting of steel, steel alloys, and ceramic.

12. Spindle motor as claimed in claim 1, characterized in that one of the inner bearing rings (9, 23a, 23b) is formed by the shaft (8) with the raceway (12).

13. Spindle motor as claimed in claim 1, characterized in that the roller bodies are surface-hardened or hard-coated.

14. Spindle motor as claimed in claim 1, characterized in that the roller bodies comprise a material whose coefficient of thermal expansion $\alpha$ is less than that of outer and inner ring(s).

15. Spindle motor as claimed in claim 14, characterized in that the roller bodies comprise ceramic.

16. Spindle motor as claimed in claim 1, characterized in that the roller bodies comprise solid material.

* * * * *